(12) United States Patent
Albano

(10) Patent No.: US 7,380,368 B2
(45) Date of Patent: Jun. 3, 2008

(54) ANIMAL TRAP

(75) Inventor: Stephen Albano, 32 Athlone Way, Menlo Park, CA (US) 94025

(73) Assignee: Stephen Albano, Menlo Park, CA (US)

( * ) Notice: Subject to any disclaimer, the term of this patent is extended or adjusted under 35 U.S.C. 154(b) by 285 days.

(21) Appl. No.: 11/334,709

(22) Filed: Jan. 18, 2006

(65) Prior Publication Data

US 2007/0163167 A1    Jul. 19, 2007

(51) Int. Cl.
*A01M 23/26*    (2006.01)
*A01M 23/24*    (2006.01)

(52) U.S. Cl. .............................................. 43/91; 43/88
(58) Field of Classification Search .................. 43/85, 43/88, 90–95
See application file for complete search history.

(56) References Cited

U.S. PATENT DOCUMENTS

| | | | | |
|---|---|---|---|---|
| 241,990 A | * | 5/1881 | Jolly ............................. | 43/94 |
| 289,268 A | * | 11/1883 | Jolly ............................. | 43/81 |
| 375,822 A | * | 1/1888 | Jolly ............................. | 43/94 |
| 488,232 A | * | 12/1892 | Ward ............................ | 43/88 |
| 636,788 A | * | 11/1899 | French ......................... | 43/94 |
| 659,932 A | * | 10/1900 | Macabee ...................... | 43/88 |
| 829,688 A | * | 8/1906 | Bean ............................ | 43/91 |
| 975,098 A | * | 11/1910 | Wyman ........................ | 43/85 |
| 1,082,649 A | * | 12/1913 | Raymond ..................... | 43/91 |
| 1,105,586 A | * | 7/1914 | Buck ............................ | 43/88 |
| 1,146,106 A | * | 7/1915 | Schmidt ....................... | 43/91 |
| 1,165,289 A | * | 12/1915 | Salof ............................ | 43/94 |
| 1,190,508 A | * | 7/1916 | Brown ......................... | 43/91 |
| 1,205,388 A | * | 11/1916 | Pewther ....................... | 43/91 |
| 1,222,024 A | * | 4/1917 | Pewther ....................... | 43/91 |
| 1,239,722 A | * | 9/1917 | Reese ........................... | 43/91 |
| 1,257,254 A | * | 2/1918 | Layton ......................... | 43/91 |
| 1,270,907 A | * | 7/1918 | Wigness ....................... | 43/91 |
| 1,376,772 A | * | 5/1921 | Kohl ............................. | 43/91 |
| 1,386,063 A | * | 8/1921 | Kuhnhenn .................... | 43/91 |
| 1,404,032 A | * | 1/1922 | Koukal ......................... | 43/91 |
| 1,445,602 A | * | 2/1923 | Moyna ......................... | 43/91 |
| 1,476,529 A | * | 12/1923 | Lutz ............................. | 43/91 |

(Continued)

FOREIGN PATENT DOCUMENTS

DE    3737511 A1 *    5/1989

(Continued)

OTHER PUBLICATIONS

Rex E. Marsh, Pocket Gopher Traps, 1997, 309 pages, Davis, California, USA.

*Primary Examiner*—Darren W Ark
(74) *Attorney, Agent, or Firm*—Kokka & Backus, PC

(57) ABSTRACT

An animal trap including jaws rotatably coupled together at a distal end, each of the jaws having one or more portions that are transverse to a longitudinal axis of the animal trap, a spring axially mounted substantially parallel to the longitudinal axis of the animal trap, the spring being configured to provide a rotating force to one or more of the jaws, and a pan hinged on one of the one or more transverse portions and configured to restrain a trip wire when pressure is applied to the pan releasing the rotating force provided by the spring and causing one or more of the plurality of jaws to rotate together.

9 Claims, 1 Drawing Sheet

U.S. PATENT DOCUMENTS

| | | | |
|---|---|---|---|
| 1,487,605 A * | 3/1924 | Risling | 43/91 |
| 1,548,989 A * | 8/1925 | Ferris | 43/90 |
| 1,574,847 A * | 3/1926 | Palmer, Sr. et al. | 43/91 |
| 1,725,470 A * | 8/1929 | Mohr | 43/91 |
| 1,791,651 A * | 2/1931 | Abeel | 43/91 |
| 1,832,644 A * | 11/1931 | McCreary | 43/85 |
| 1,926,121 A * | 9/1933 | Stassart | 43/91 |
| 2,059,453 A * | 11/1936 | Hain | 43/91 |
| 2,095,101 A * | 10/1937 | Pewther | 43/91 |
| 2,231,984 A * | 2/1941 | Anderson | 43/81 |
| 2,321,219 A * | 6/1943 | Lewis | 43/81 |
| 2,436,985 A * | 3/1948 | Abeel | 43/91 |
| 2,680,323 A * | 6/1954 | Shaw | 43/91 |
| 3,045,385 A * | 7/1962 | Pfennighausen | 43/90 |
| 3,529,377 A * | 9/1970 | Anderson | 43/91 |
| 4,109,407 A * | 8/1978 | Johnson | 43/85 |
| 4,733,494 A * | 3/1988 | Johnson et al. | 43/85 |
| 4,856,225 A * | 8/1989 | Radesky et al. | 43/92 |
| 6,101,761 A * | 8/2000 | Sprick | 43/88 |

FOREIGN PATENT DOCUMENTS

| | | | |
|---|---|---|---|
| FR | 2627953 A * | 9/1989 | |
| FR | 2662580 A1 * | 12/1991 | |
| SU | 1386134 A * | 4/1988 | |

\* cited by examiner

U.S. Patent     Jun. 3, 2008     US 7,380,368 B2
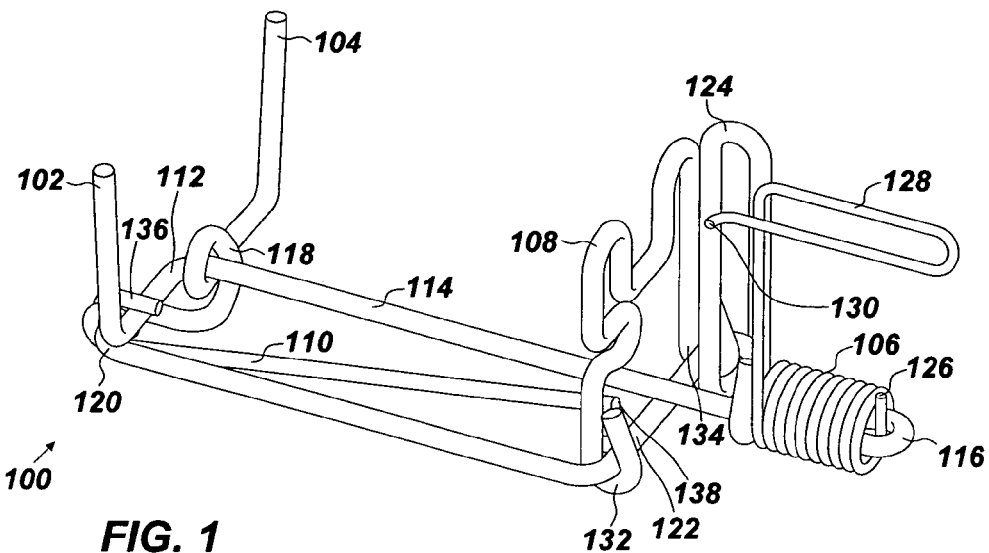
FIG. 1
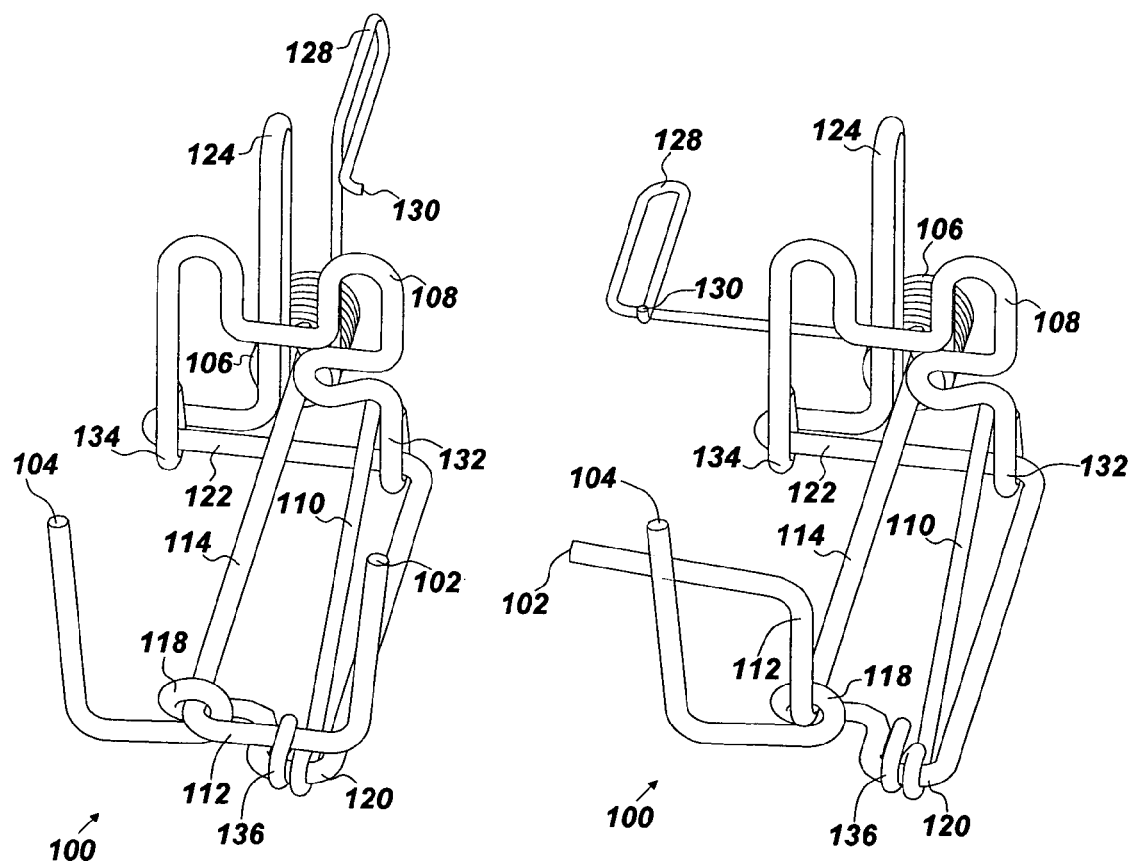
FIG. 2         FIG. 3

ANIMAL TRAP

FIELD OF THE INVENTION

The present invention relates generally to pest and rodent control. More specifically, an animal trap is described.

BACKGROUND OF THE INVENTION

Rodents, pests, and other burrowing animals such as moles and gophers can cause significant property damage. If not controlled, burrowing animals can damage lawns, gardens, crops, homes, and property. These animals, including gophers and moles, are often difficult to catch, kill, or prevent from burrowing and causing damage.

Some conventional techniques for controlling burrowing animals (e.g., gopher, mole, and other burrowing creatures) include poisons, deterrents (e.g., fences), and traps. Some conventional techniques use poisons to control burrowing animal populations, but these can also cause undesirable harm by poisoning soil, polluting water tables, affecting crops, or causing other adverse environmental or ecological effects. Deterrents such as fences can also be used, but burrowing animals are often able to dig underneath or chew through deterrents, regardless of whether a portion of the fence has been buried. Traps are still another conventional solution, but there is a large variation in the design and material of the traps, leading to mixed and, often, unsuccessful results.

For example, some conventional traps are designed for placement inside the mouth or opening of a hole burrowed by an animal (e.g., gopher, mole, and the like). Animals are forced to move across or over parts of the trap for activation, but various parts of conventional traps have large, solid cross-sectional areas that can intimidate or discourage an animal from entering the trap. Other conventional problems include failure to kill an animal that springs a trap due to inadequate spring tension, or compromised function due to corroded or deteriorated components. Some conventional traps have mechanisms that produce inadequate force to hold and kill animals, resulting in animals escaping from traps and becoming "trap shy." Another problem with conventional traps is the large numbers of parts and complex manufacturing requirements (e.g., soldering numerous components together). Further, conventional traps may be difficult to use, set, or trip, also resulting in decreased effectiveness. Still further, some conventional traps use materials that deteriorate or corrode over time, particularly when placed in-ground and exposed to moisture-laden setting such as lawns, golf courses, gardens, and the like. Weakened components or increased friction on moving parts due to corrosion or deterioration can result in the complete failure of conventional traps.

Thus, what is needed is an animal trap without the limitations of conventional techniques.

BRIEF DESCRIPTION OF THE DRAWINGS

Various embodiments of the invention are disclosed in the following detailed description and the accompanying drawings:

FIG. 1 illustrates an exemplary animal trap, in accordance with an embodiment;

FIG. 2 illustrates an alternative view of an exemplary animal trap, in accordance with an embodiment; and FIG. 3 illustrates another alternative view of an exemplary animal trap, in accordance with an embodiment.

DETAILED DESCRIPTION

Various embodiments of the invention may be implemented in numerous ways as an apparatus. A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

FIG. 1 illustrates an exemplary animal trap, in accordance with an embodiment. In some examples, trap 100 includes first jaw segment 102, second jaw segment 104, spring 106, pan 108, and trip wire 110. Here, first jaw segment 102 may also include first transverse portion 112, longitudinal axis 114, and spring loop 116. Second jaw segment 104 includes, in some examples, coupling loop 118, second transverse portion 120, third transverse portion 122, and spring and finger grip 124. Components of trap 100 may be formed from various materials, including stainless steel, tempered steel, spring-tempered stainless steel, music wire, and others. Materials used to form the described components of trap 100 may be formed using a variety of materials and are not limited to the examples provided. For example, first jaw segment 102 and second jaw segment 104 may be formed using 0.125 (⅛" diameter) wire, rods, dowels, and the like. As another example, pan 108 and trip wire 110 may be formed using 0.110 diameter wire, rods, dowels, and the like. Further, spring 106 may be formed using 0.067 diameter wire, rods, dowels, and the like. The above-described examples are provided for illustration purposes and are not limiting to the various examples described below. Components, sizes, and materials may be varied for the various components of trap 100.

Here, spring 106 may also be configured to include proximal spring tip 126, spring catch 128, and distal spring tip 130. Spring 106 is positioned substantially about the axis of first jaw segment 102, but because of placement behind finger grip 124 and direct application of stored rotation force (i.e., due to winding of the spring), trap 100 may close with greater speed and force to trap and kill an animal. Further, spring 106 may be formed using materials of smaller gauge or diameter without losing rotational force or strength. The position of spring 106 behind (i.e., proximal) to finger grip 124 and pan 108 allows the area between first jaw segment 102 and second jaw segment 104 to be entered (by an animal) and not have substantial obstructions that might deter entry. The position of spring 106 provides flexibility in shape, size, and material that may be used to implement spring 106. Further, the position of spring 106 also provides a reduced opportunity for corrosion or deterioration that could induce resistance in the operation of trap 100.

In some examples, pan 108 may be configured to have hinges 132 and 134, which may be bent about third transverse portion 122 in the direction shown or in the opposite direction. Further, hinges 132-134 may also be coupled to third transverse portion 122 differently and are not limited to the coupling technique shown. In some examples, hinges 132-134 couple pan 108 to third transverse portion 122 allowing for free rotation about the transverse axis of third transverse portion 122. Although formed from wire in the illustrated example, pan 108 may be formed from a solid component instead of wire. Pan 108 may also be formed from other materials and is not limited to those shown or described.

In some examples, trip wire 110 is also rotatably coupled about second transverse portion 120. In some examples, rotatably coupling trip wire 110 about second transverse portion 120 allows trip wire 110 to be set under spring or torsion force and restrained by pan 108. When set in a restrained position, tip 136 of trip wire 110 restrains first jaw segment 102 in an open position and proximal tip 138 of trip wire 110 is restrained by a lower edge of pan 108. When tripped (i.e., pressure is placed against pan 108 which releases tripwire 110 from its restrained position underneath a lower edge of pan 108 thus permitting spring 106 to cause first jaw segment 102 to rotate), first jaw segment 102 rotates inward toward second jaw segment 104, causing the jaws to close and, subsequently, trapping, injuring, or otherwise incapacitating the animal. Although trap 100 has been described as having the above components and features, in other examples, some, none, or all of the components may be varied within the function and structure described. Trap 100 is not limited to the examples described and may be varied accordingly.

For components 102-134, stainless steel, iron, or other materials may be used to form trap 100 and its various components. Stainless steel may be used to prevent corrosion and extend the working life of trap 100. For example, spring 106 may be formed using a malleable or semi-malleable material that provides for different levels of spring or torsion force. Trap 100 may be formed using materials to create first jaw segment 102, second jaw segment 104, spring 106, pan 108, and trip wire 110. These five components may be implemented using substantially similar or different materials for each component. Also, components of trap 100 (e.g., first jaw segment 102, second jaw segment 104, spring 106, pan 108, and trip wire 110) may be formed using varying dimensions and sizes in order to implement the configuration shown in FIG. 1.

In some examples, trap 100 may be placed in a "set" configuration by winding spring catch 128 and placing distal spring tip 130 under tension alongside finger grip 124. In other words, spring catch 128 may be used to wind spring 106, which is secured and prevented from free rotation by the placement of proximal spring tip 126 in spring loop 116. Tension stored as rotational force in spring 106, when wound, is secured in place by position distal spring tip 130 against the far side of finger grip 124. Although not shown here, when spring 106 is under tension and pan 108 is substantially upright and holding trip wire 110 from free rotation around second transverse portion 120, trap 100 is set. When an animal (e.g., gopher, mole, and the like) moves between first jaw segment 102 and second jaw segment 104 and applies pressure against pan 108, trip wire 110 is released, allowing the stored rotational force/energy in spring 106 to rotate first transverse portion 102 towards second transverse portion 104. Rotational force/energy from spring 106 closes first transverse portion 102 with second transverse portion 104 with force and speed and, thus, traps and kills the animal activating trap 100.

When first jaw segment 102 and second jaw segment 104 close together, an animal is trapped and killed. In some examples, an additional wire (i.e., a retrieval wire; not shown) may be attached to spring loop 116 and used to manually retrieve or position the trap in a burrow, tunnel, or hole. After being "tripped," trap 100 releases spring tension from spring 106 to rotate first jaw segment 102 to close with second jaw segment 104, but distal spring tip 130 remains in position against finger grip 124. Although not shown, the released position allows spring 106 to rotate and apply rotational force to first jaw segment 102, but distal spring tip 130 remains in position to prevent an animal from forcing first jaw segment 102 away from second jaw segment 104 and thus opening and escaping from trap 100. Further, if spring 106 is placed under significant spring or torsion force, first jaw segment 102 and second jaw segment 104 may close forcefully causing musculoskeletal or other bodily damage to the animal, resulting in asphyxiation, internal bleeding or hemorrhaging, or immediate death.

In some examples, first jaw segment 102 may be formed from a single wire or length of heavy to medium gauge stainless steel. In other examples, different gauges or materials may be used. A 90 degree bend provides for a jaw tip and first transverse portion 112, around which second jaw segment 104 rotatably couples. Second jaw segment 104 may also be formed using materials similar to that used for first jaw segment 102. By also using a 90 degree bend, another jaw tip that is substantially parallel to the jaw tip of first jaw segment 102. Second jaw segment may be formed so as to wrap around longitudinal axis 114, which provides a pivot point for first jaw segment 102 to rotate together with second jaw segment 104, when pressure is applied to pan 108, which acts as the restraint mechanism for trip wire 110 and closing force provided from spring 106.

Here, pan 108 may also be formed from a single wire, rod, dowel, sheet metal, or the like. Varying gauges, diameters, and hardness in materials may be used and are not confined to the example shown. In some examples, pan 108 may be formed to include various curves, twists, or other shapes that provide a barrier when the trap is set. Pan 108 may be implemented differently (e.g., using a solid, sheet metal surface or the like) and is not restricted to the implementation shown.

The barrier provided by pan 108 acts as an obstruction to an animal that is attempting to move through a burrow. When the animal moves between first jaw segment 102 and second jaw segment 104, it then encounters pan 108. When the animal presses against or applies pressure to pan 108, trip wire 110 is released and allows spring 106 to rotate first jaw segment 102 together against second jaw segment 104, thus closing the jaws quickly and forcefully. Rapid and forceful closure restrains, injures, or kills the animal. Pan 108 may be configured differently and is not limited to the example illustrated. Further, trap 100 and components 102-134 may be configured differently and are not limited to the examples described.

FIG. 2 illustrates an alternative view of an exemplary animal trap, in accordance with an embodiment. Here, another view of trap 100 is shown in a set position (i.e., spring or torsion force has been applied to spring 106 and first jaw segment 102 and second jaw segment 104 are held open in a restrained position). In some examples, trap 100 includes first jaw segment 102, second jaw segment 104, spring 106, pan 108, and trip wire 110. Here, first jaw segment 102 may also include first transverse portion 112, longitudinal axis 114, and spring loop 116. Second jaw segment includes, in some example, coupling loop 118, second transverse portion 120, third transverse portion 122, and spring and finger grip 124. Spring 106 may also be configured to include proximal spring tip 126, spring catch 128, and distal spring tip 130. Pan 108 may be configured to have hinges 132 and 134.

Here, the "set" or ready position refers to the state in which the trap has been wound (i.e., using spring catch 128 and placing proximal spring tip 130 against spring and finger grip 124) and the trip wire has been placed in a position to prevent first jaw segment 102 from rotating together with second jaw segment 104. When set, energy from spring 106 has been stored as a rotating or torsion (i.e., "closing force") force that, when released by trip wire 110, causes first jaw segment 102 to rotate together with second jaw segment 104 violently, trapping any animal that may be lying along the longitudinal axis of trap 100. Pan 108 acts as a trigger or release mechanism that, when pressed slightly, releases trip wire 110 and allows first jaw segment 102 and second jaw segment 104 to close. Pan 108 has been formed to provide a barrier that is large enough to provide enough surface or contact areas for an animal to trip trap 100 without obstructing or providing a large, solid obstacle or blockage in a burrow.

FIG. 3 illustrates another alternative view of an exemplary animal trap, in accordance with an embodiment. Here, another view of trap 100 is shown in a tripped position (i.e., spring or torsion force has been applied from spring 106 and first jaw segment 102 and second jaw segment 104 have closed together under the force released from spring 106). In some examples, trap 100 includes first jaw segment 102, second jaw segment 104, spring 106, pan 108, and trip wire 110. Here, first jaw segment 102 may also include first transverse portion 112, longitudinal axis 114, and spring loop 116. Second jaw segment includes, in some examples, coupling loop 118, second transverse portion 120, third transverse portion 122, and spring and finger grip 124. Spring 106 may also be configured to include proximal spring tip 126, spring catch 128, and distal spring tip 130. Pan 108 rotates about third transverse portion 122 using hinges 132 and 134, which may be formed using the endpoints of the wire, rod, or dowel of pan 108. In other examples, pan 108 and hinges 132 and 134 may be formed differently.

In some examples, FIG. 3 illustrates trap 100 in an alternative view. When placed in a set position or before being "tripped," spring catch 128 is substantially upright (although, here, spring catch 128 is shown "lying down") and distal spring tip 130 is placed under pressure against a vertical surface or side of finger grip 124. Here, closing force has been released from spring 106 when pan 108 is depressed or pushed back towards spring and finger grip 124, releasing trip wire 110 and allowing first jaw segment 102 to rotate towards second jaw segment 104. When closed, forcefully, first jaw segment 102 and second jaw segment 104 close together and trap an animal lying substantially parallel to longitudinal axis 114. The force determined by the number of times spring 106 is wound about longitudinal axis 114 is directly related to the force applied to the animal's body when first jaw segment 102 closes with second jaw segment 104. Further, the material used to form spring 106 may also provide additional strength to spring 106 and, subsequently, to the closing force transferred to first jaw segment 102 when the trap is sprung.

Although the foregoing examples have been described in some detail for purposes of clarity of understanding, the invention is not limited to the details provided. There are many alternative ways of implementing the invention. The disclosed examples are illustrative and not restrictive.

What is claimed:

1. An animal trap, comprising:
   a first jaw segment having a first transverse portion transverse to a longitudinal axis of the first jaw segment, formed at a first proximal end of the first jaw segment and a spring loop disposed at a first distal end of the first jaw segment;
   a second jaw segment having a second transverse portion transverse to the longitudinal axis of the first jaw segment, disposed at a second proximal end of the second jaw segment and also having a third transverse portion transverse to the longitudinal axis of the first jaw segment, disposed at a second distal end of the second jaw segment, the second jaw segment being rotatably coupled to the first proximal end;
   a spring axially mounted on the longitudinal axis of the first jaw segment and secured by the spring loop, the spring providing a rotating force;
   a pan hinged on the third transverse portion at the second distal end, a plane in which the pan lies being disposed substantially perpendicular to the longitudinal axis of the first jaw segment; and
   a trip wire having a distal end rotatably mounted on the first transverse portion and a proximal end restrained by the pan, the trip wire being released when pressure is applied to the pan causing the first jaw segment and the second jaw segment to close together.

2. The animal trap recited in claim 1, wherein the first jaw segment, the second jaw segment, the spring, the pan, and the trip wire are formed from substantially similar material.

3. The animal trap recited in claim 2, wherein the substantially similar material is stainless steel.

4. The animal trap recited in claim 1, wherein the second jaw segment is rotatably coupled to the first jaw segment by forming a loop in the second jaw segment around the longitudinal axis of the first jaw segment.

5. The animal trap recited in claim 1, wherein the spring is coiled around the longitudinal axis of the first jaw segment.

6. The animal trap recited in claim 1, wherein the first jaw segment rotates towards the second jaw segment when the trip wire is released.

7. The animal trap recited in claim 1, wherein the pan is formed from a wire.

8. The animal trap recited in claim 7, wherein the pan includes a plurality of curves in the wire, wherein each of the plurality of curves is substantially co-planar to the plane.

9. The animal trap recited in claim 1, wherein a retrieval wire is coupled to the spring loop.

* * * * *